United States Patent
Wan et al.

(10) Patent No.: US 9,923,814 B2
(45) Date of Patent: Mar. 20, 2018

(54) MEDIA ACCESS CONTROL ADDRESS RESOLUTION USING INTERNET PROTOCOL ADDRESSES

(71) Applicant: Huawei Technologies Co., Ltd., Shenzhen (CN)

(72) Inventors: Tao Wan, Ottawa (CA); Yapeng Wu, Nepean (CA); Xingjun Chu, Ottawa (CA); Peter Ashwood-Smith, Gatineau (CA); Guoli Yin, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 14/623,840

(22) Filed: Feb. 17, 2015

(65) Prior Publication Data
US 2016/0241471 A1    Aug. 18, 2016

(51) Int. Cl.
| | |
|---|---|
| *H04B 3/20* | (2006.01) |
| *H04L 12/741* | (2013.01) |
| *H04L 29/12* | (2006.01) |
| *H04L 12/721* | (2013.01) |

(52) U.S. Cl.
CPC ............ *H04L 45/74* (2013.01); *H04L 61/103* (2013.01); *H04L 61/6022* (2013.01); *H04L 45/66* (2013.01); *H04L 61/2015* (2013.01)

(58) Field of Classification Search
CPC . H04L 61/103; H04L 29/12018; H04L 61/10; H04L 29/12028
See application file for complete search history.

(56) References Cited

U.S. PATENT DOCUMENTS

| | | | |
|---|---|---|---|
| 7,526,762 B1* | 4/2009 | Astala | G06F 8/33 709/203 |
| 2006/0056384 A1* | 3/2006 | Ishii | H04L 45/50 370/351 |
| 2008/0016556 A1* | 1/2008 | Selignan | H04W 4/22 726/7 |
| 2009/0129290 A1 | 5/2009 | Seo et al. | |
| 2011/0185055 A1 | 7/2011 | Nappier et al. | |
| 2012/0198091 A1* | 8/2012 | Kanada | H04L 12/4641 709/238 |
| 2013/0230053 A1 | 9/2013 | Hammer et al. | |

(Continued)

FOREIGN PATENT DOCUMENTS

| | | |
|---|---|---|
| CN | 101132374 A | 2/2008 |
| WO | 2008109400 A1 | 9/2008 |
| WO | WO 2008109400 A1 * | 9/2008 ......... H04L 29/1232 |

OTHER PUBLICATIONS

Foreign Communication From a Counterpart Application, PCT Application No. PCT/CN2016/073698, English Translation of International Search Report dated May 11, 2016, 7 pages.

(Continued)

*Primary Examiner* — Maharishi Khirodhar
(74) *Attorney, Agent, or Firm* — Conley Rose, P.C.

(57) ABSTRACT

An address resolution method, comprising obtaining an Internet Protocol (IP) address for a destination network node, computing a Media Access Control (MAC) address for the destination network node using a mapping function and the IP address for the destination network node, and sending data traffic using the MAC address computed for the destination network node.

20 Claims, 4 Drawing Sheets

(56) References Cited

U.S. PATENT DOCUMENTS

| | | | | |
|---|---|---|---|---|
| 2013/0308641 A1* | 11/2013 | Ackley | ............... | H04L 45/7457 370/392 |
| 2014/0153577 A1* | 6/2014 | Janakiraman | ........... | H04L 47/28 370/392 |
| 2014/0254611 A1* | 9/2014 | Vavili | ................... | H04L 45/745 370/474 |
| 2016/0057098 A1* | 2/2016 | Han | ...................... | H04L 61/103 370/390 |
| 2016/0087887 A1* | 3/2016 | Fung | ................... | H04L 49/3009 370/401 |

OTHER PUBLICATIONS

Foreign Communication From a Counterpart Application, PCT Application No. PCT/CN2016/073698, English Translation of Written Opinion dated May 11, 2016, 5 pages.

"Guidelines for 64-bit Global Identifier (EUI-64) General," IEEE Standards Association, EUI-64 Guidelines, IEEE, Retrieved Mar. 29, 2017, 3 pages.

"MAC Address," Wikipedia, https://en.wikipedia.org/wiki/MAC_address, Retrieved Mar. 29, 2017, 3 pages.

* cited by examiner

MEDIA ACCESS CONTROL ADDRESS RESOLUTION USING INTERNET PROTOCOL ADDRESSES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Address Resolution Protocol (ARP) is a broadcast based protocol for resolving a Media Access Control (MAC) address from an Internet Protocol (IP) address. An ARP request may be broadcast by a network node within a Layer 2 domain for a MAC address of a destination network node. Another network node or a delegating server may be configured to respond to the ARP request with an ARP response that comprises the requested MAC address of the destination network node. Broadcasting ARP requests may consume network bandwidth and/or computational resources which may cause network performance issues. ARP may be insecure and subject to attacks, such as, ARP poisoning attacks, ARP request spoofing, and ARP response spoofing. Some systems may attempt to limit the scope of a Layer 2 domain to mitigate ARP issues. However, limiting the scope of the Layer 2 domain may be difficult in Layer 2 dominant systems, such as, a data center where large layer 2 networks are used to better support virtual machine migration. A virtual machine is a software implementation of a machine (e.g., a computer) that executes programs like a physical machine. Other systems may install an ARP proxy on each host and/or network. The ARP proxy may be aware of many IP address to MAC address mappings for a plurality of network nodes within a network. However, ARP proxies may obtain and map IP addresses and MAC addresses using ARP requests and may also be subjected to ARP issues. Hence, obtaining a MAC address without using ARP may be desirable.

SUMMARY

In one embodiment, the disclosure includes an address resolution method comprising obtaining an IP address for a destination network node, computing a MAC address for the destination network node using a mapping function and the IP address for the destination network node, and sending data traffic using the MAC address computed for the destination network node.

In another embodiment, the disclosure includes an address resolution method comprising obtaining an IP address for a network node, computing a MAC address for the network node in accordance with the IP address for the network node, and configuring an Ethernet interface using the MAC address computed for the network node.

In yet another embodiment, the disclosure includes an apparatus comprising a receiver configured to receive an IP address for a destination network node from a network node, and a processor coupled to a memory and the receiver, wherein the memory comprises computer executable instructions stored in a non-transitory computer readable medium such that when executed by the processor causes the processor to compute a MAC address for the destination network node using a mapping function and the IP address for the destination network node, and send data traffic using the MAC address computed for the destination network node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for resolving MAC addresses using IP addresses. Various embodiments may allow a network node to determine a MAC address for a destination network node using the IP address of the destination network node without using an ARP request or sending an ARP request outside of a network node. A network node may be configured to obtain an IP address for a destination network node, to compute a MAC address for the destination network node using the IP address, and to send data traffic using the computed MAC address and/or IP address. A network node may also be configured to compute or generate its own MAC address using its own IP address and to configure an Ethernet interface using the computed MAC address. Performance may be improved by reducing or avoiding the use of ARP (e.g., ARP requests and ARP responses), which may result in network bandwidth and/or computation power savings. Network security may also be improved without by reducing the use of ARP requests. For example, attacks using ARP poisoning may be mitigated within a network. In some embodiments, generating MAC addresses may also reduce the amount of memory and/or storage capacity required to store network addresses. For example, MAC addresses for other network nodes may be computed on-demand rather than stored in memory.

Figure 1:
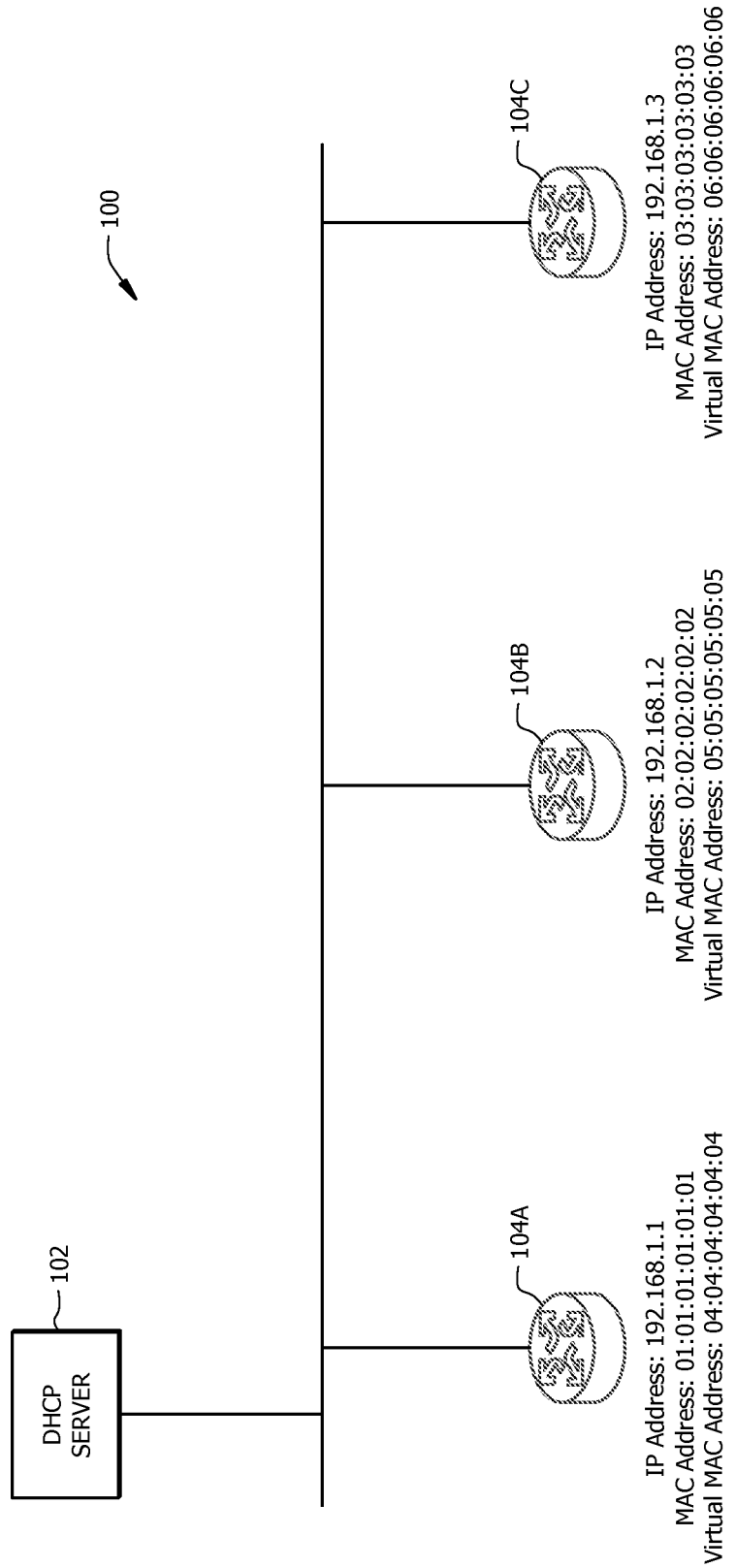
FIG. 1 is a schematic diagram of an embodiment of a network.

FIG. 1 is a schematic diagram of an embodiment of a network 100 where an embodiment of the present disclosure may operate. Network 100 may comprise a delegating server 102 and a plurality of network nodes 104A-104C that support the transportation of data traffic (e.g., data packets) through the network 100. Delegating server 102 may be a server or a network configured to provide network addresses (e.g., IP addresses and/or MAC addresses) for network 100. In an embodiment, the delegating server 102 may be a dynamic host configuration protocol (DHCP) server which may be configured to allocate IP addresses (e.g., IP version 4 (IPv4) addresses and/or IP version 6 (IPv6) addresses) and/or prefixes for network 100. Network nodes 104A-104C may be any devices and/or components that support the transportation of data traffic (e.g., data packets) through network 100. For example, network nodes 104A-104C may comprise switches, routers, any other suitable networking device for communicating data packets as would be appreciated by one of ordinary skill in the art upon viewing this disclosure, or combinations thereof. Network nodes 104A-104C may be configured to obtain or determine an IP address, to compute a MAC address using the IP address, to configure an Ethernet interface using the computed MAC address, and/or to communicate data traffic using the computed MAC address and/or IP address. Network nodes 104A-104C may each be uniquely assigned and/or identified by an IP address and a MAC address. Network nodes 104A-104C may be configured such that a MAC address for each network node 104A-104C is configurable or reconfigurable. Network nodes 104A-104C may also be configured as virtual machines or to implement a virtual machine. Virtual machines may be employed to provide virtualization within network 100. A virtual machine may be implemented on network nodes 104A-104C using any suitable protocol and/or implementation as would be appreciated by one of ordinary skill in the art upon viewing this disclosure. One or more virtual MAC addresses may be associated with a network node implementing a virtual machine. A virtual MAC address may be generated and/or computed for a network node implementing a virtual machine. Network nodes 104A-104C may comprise a physical MAC address (e.g., a vendor supplied MAC address) and/or one or more virtual MAC addresses. In an embodiment, the one or more virtual MAC addresses may be used for data communications and virtualization and the physical MAC address may be used for other purposes (e.g., authorization or authentication).

Delegating server 102 and network nodes 104A-104C may be coupled to one another via a plurality of links and/or tunnels. Links discussed herein may be physical links, such as, electrical links, optical links, and/or logical links (e.g., virtual links) used to transport data. While the embodiment of FIG. 1 is disclosed with respect to a particular configuration of network nodes 104A-104C, it is noted that the network 100 may comprise any suitable number of network nodes 104A-104C and/or configuration of network nodes 104A-104C as would be appreciated by one of ordinary skill in the art upon viewing this disclosure.

Figure 2:
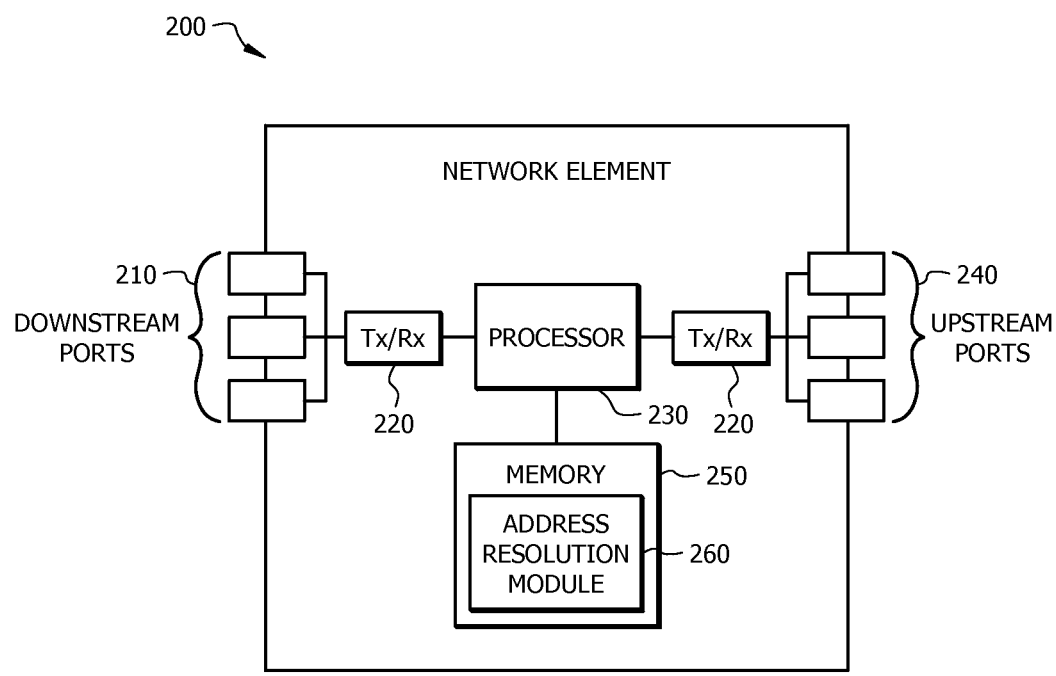
FIG. 2 is a schematic diagram of an embodiment of a network element.

FIG. 2 is a schematic diagram of an embodiment of a network element 200 that may be used to transport and process data traffic through at least a portion of the network 100 shown in FIG. 1. For example, network element 200 may be implemented in and/or integrated within a delegating server 102 or a network node 104A-104C described in FIG. 1. At least some of the features/methods described in the disclosure may be implemented in the network element 200. For instance, the features/methods of the disclosure may be implemented in hardware, firmware, and/or software installed to run on the hardware. The network element 200 may be any device (e.g., a modem, a switch, router, bridge, server, client, etc.) that transports data through a network, system, and/or domain. Moreover, the terms network "element," "node," "component," "module," and/or similar terms may be interchangeably used to generally describe a network device and do not have a particular or special meaning unless otherwise specifically stated and/or claimed within the disclosure. In one embodiment, the network element 200 may be an apparatus configured to implement a virtual machine, to determine (e.g., compute) a MAC address using an IP address, to configure an Ethernet interface using the MAC address, and/or to communicate data packets through a network using the MAC address.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components.

A processor 230 may be coupled to the Tx/Rx 220 and may be configured to process the frames and/or determine which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to compute a MAC address for destination network node using an IP address for the destination network node, to configure an Ethernet interface using the MAC address, and/or to communicate data packets through a network to the destination network node using the computed MAC address.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various example embodiments described herein. In one example embodiment, the memory module 250 may comprise an address resolution module 260 that may be implemented on the processor 230. In one embodiment, the address resolution module 260 may be implemented to communicate data packets through a network, to implement a virtual machine, to determine and/or to compute a MAC address using an IP address, and/or to configure an Ethernet interface using the MAC address. For example, the address resolution module 260 may be configured to determine a MAC address for a destination network node using an IP address for the destination network node, and to send data traffic to the destination network node using the computed MAC address. Address resolution module 260 may also be configured to determine an IP address for the network element 200, to compute a MAC address (e.g., a physical MAC address and/or a virtual MAC address) for the network element 200, and to configure an Ethernet interface using the computed MAC address. In an embodiment, such may be done according to address resolution protocol 300, address resolution method 400, and/or address resolution 500. Address resolution module 260 may be implemented in a transmitter (Tx), a receiver (Rx), or both.

It is understood that by programming and/or loading executable instructions onto the network element 200, at least one of the processors 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
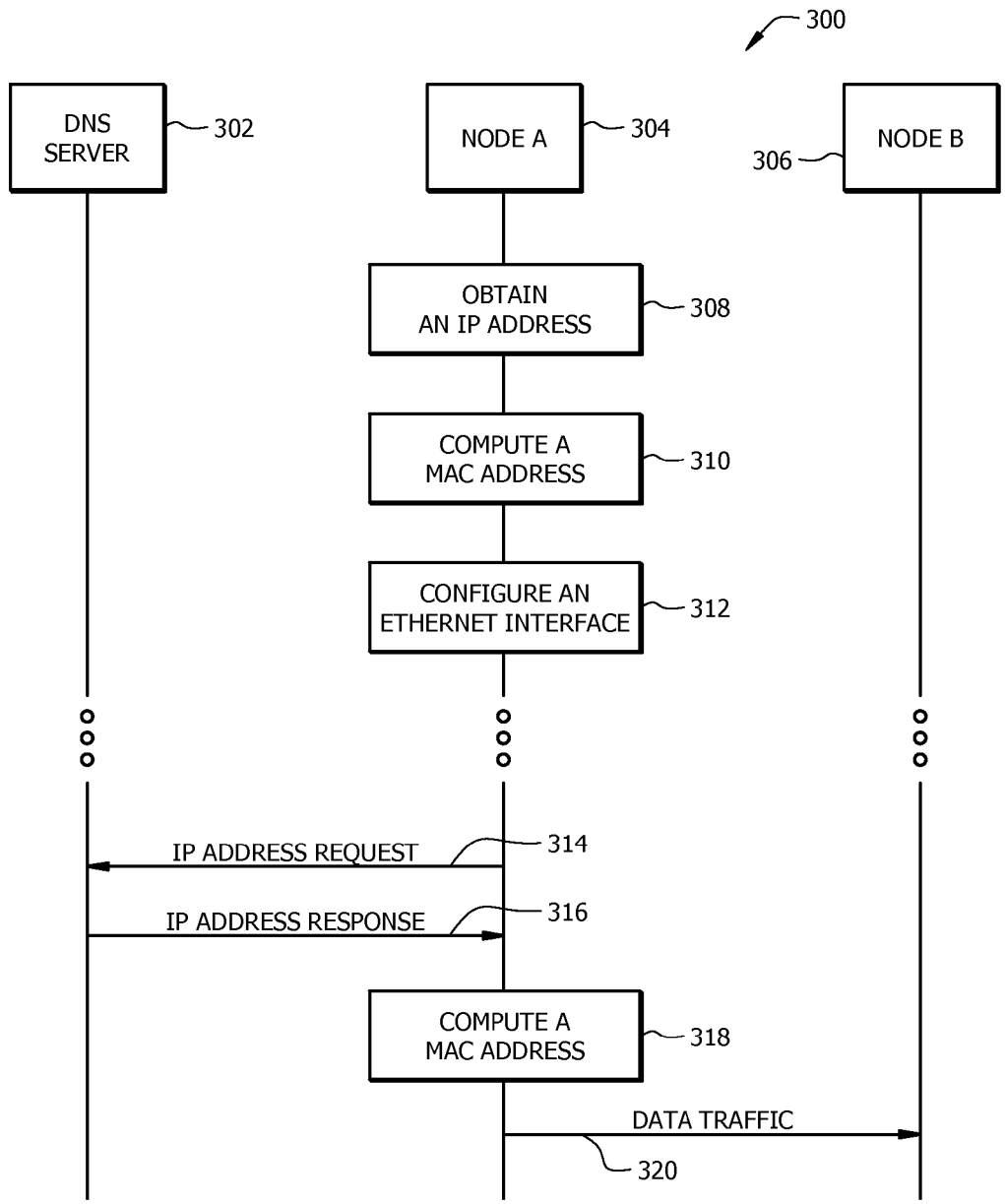
FIG. 3 is a protocol diagram of an embodiment of an address resolution protocol.

FIG. 3 is a protocol diagram of an embodiment of an address resolution protocol 300. Delegate server 302 and network nodes 304 and 306 may be configured similar to delegate server 102 and network nodes 104A-104C described in FIG. 1, respectively. Network node 304 may be configured to determine an IP address for a network node 306, to compute a MAC address for network node 306 using the IP address for network node 306, and to configure an Ethernet interface using the MAC address. Additionally, network node 304 may be configured to obtain an IP address from a delegate server 302 (e.g., a domain name system (DNS) server), to compute a MAC address using the IP address, and to send data traffic using the MAC address and/or the IP address for network node 306.

At step 308, network node 304 may obtain an IP address for network node 306. In an embodiment, network node 304 may be configured to determine an IP address for itself, for example, using configuration information (e.g., an IP address) provided by a network operator or a vendor. At step 310, network node 304 may compute a MAC address (e.g., physical MAC address and/or virtual MAC address) for the IP address determined. Network node 304 may be configured to compute a MAC address for another network node (e.g., network node 306) using an IP address for the other network node and/or to compute a MAC address for itself using its own IP address. Network node 304 may be configured to use an IP address as an input to a mapping function that computes a MAC address in accordance with the IP address. The mapping function may be configured to associate an IP address to a MAC address and/or to perform one or more operations using the IP address to derive a MAC address. For example, a mapping function may combine a 32-bit IP address for a network node and a 16-bit identifier (e.g., a network device identifier, a tenant system identifier, or a virtual machine identifier) to generate a 48-bit MAC address. Mapping functions may include, but are not limited to, hashing algorithms, a one-to-one mapping between a MAC address and an IP address, and a tenant identifier (ID). For example, a hashing function (e.g., secure hash algorithm (SHA) 1) is used against the IP address and at least a portion of the result (e.g., the first 48 bits) is used as the MAC address. In another example, a MAC address is obtained by prefixing the IP address with a tenant ID (e.g., a virtual local area network (VLAN) ID or a multiprotocol label switching (MPLS) label). In yet another example, a mapping function may use n-bits of an IP address (e.g., n<32) as a postfix to a tenant ID (e.g., a 48-n bit tenant ID). The value of n depends on the type of IP address that is used. For instance, n may equal eight when the IP address is a private IP address (e.g., 10.x.x.x). The last 24 bits of the IP address can be mapped to a MAC address that is prefixed with a 24 bit tenant ID. In an embodiment, if a destination IP address is located in a different subnet (e.g., an IP packet is to be forwarded by a router), the mapping function will use the IP address of the gateway to compute the destination MAC address. At step 312, network node 304 may configure an Ethernet interface using the MAC address. Network node 304 may be configured to use a computed MAC address based on its own IP address to configure an Ethernet interface for network node 304. Configuring the Ethernet interface may comprise configuring, reconfiguring, or overwriting an existing MAC address (e.g., a physical MAC address and/or a virtual MAC address) or generating a new MAC address (e.g., a virtual MAC address) using the computed MAC address.

At step 314, network node 304 may send an IP address request to delegate server 302. Network node 304 may be configured to send the IP address request within a Layer 2 domain (e.g., a collision domain) and/or within a Layer 3 domain (e.g., a broadcast domain). The IP address request may request an IP address for one or more network nodes within a network. For example, network node 304 may send an IP address request for a destination network node 306 or may send an IP address request for all network nodes within the network. At step 316, delegate server 302 may send an IP address response to network node 304. The IP address response may comprise the one or more IP addresses requested in the IP address request. The IP address response may not comprise one or more MAC addresses associated with the one or more IP address in the IP address response. For example, delegate server 302 may send the IP address of a network node when the network node is within the same subnet as network node 304 and may send a default gateway IP address associated with the network node when the network node is not in the same subnet as network node 304. At step 318, network node 304 computes a MAC address for network node 306 using the IP address for network node 306. Network node 304 may compute the MAC address for network node 306 similar to as described in step 310. At step 320, network node 306 may send data traffic (e.g., data packets) to network node 306 using the MAC address and/or the IP address for network node 306. Network node 304 may be configured to send Layer 3 data packets using the IP address and the computed MAC address for network node 306 and/or to send Layer 2 data packets using the computed MAC address for network node 306.

Figure 4:
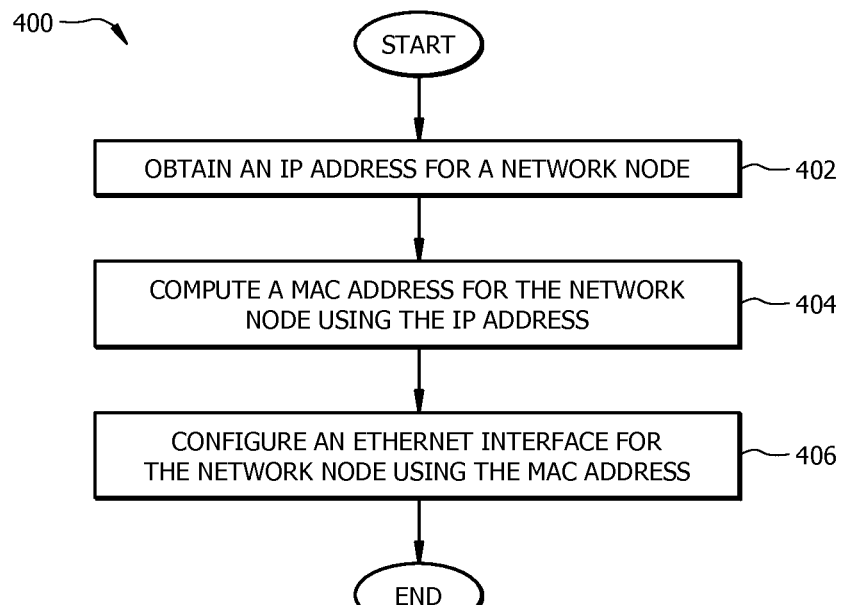
FIG. 4 is a flowchart of an embodiment of an address resolution method.

FIG. 4 is a flowchart of an embodiment of an address resolution method 400 for a network node, which may be similar to the instructions stored in address resolution module 260 described in FIG. 2. In an embodiment, a network node (e.g., network node 104A-104C described in FIG. 1) may be configured to determine an IP address for the network node, to compute a MAC address for the network node using the IP address, and to configure an Ethernet interface for the network node using the computed MAC address. At step 402, the network node may obtain an IP address for itself for generating or computing a physical MAC address and/or a virtual MAC address. For example, the network node may obtain an IP address from a DHCP server or from a network operator. At step 404, the network node may compute a MAC address (e.g., physical MAC address and/or virtual MAC address) using the determined IP address for the network node. The network node may compute the MAC address for the network node using the IP address for the network node similar to step 312 described in FIG. 3. At step 406, the network node may configure an Ethernet interface using the MAC address. The network node may configure an Ethernet interface using a computed physical MAC address and/or one or more computed virtual MAC addresses. The network node may configure the Ethernet interface similar to step 312 described in FIG. 3.

Figure 5:
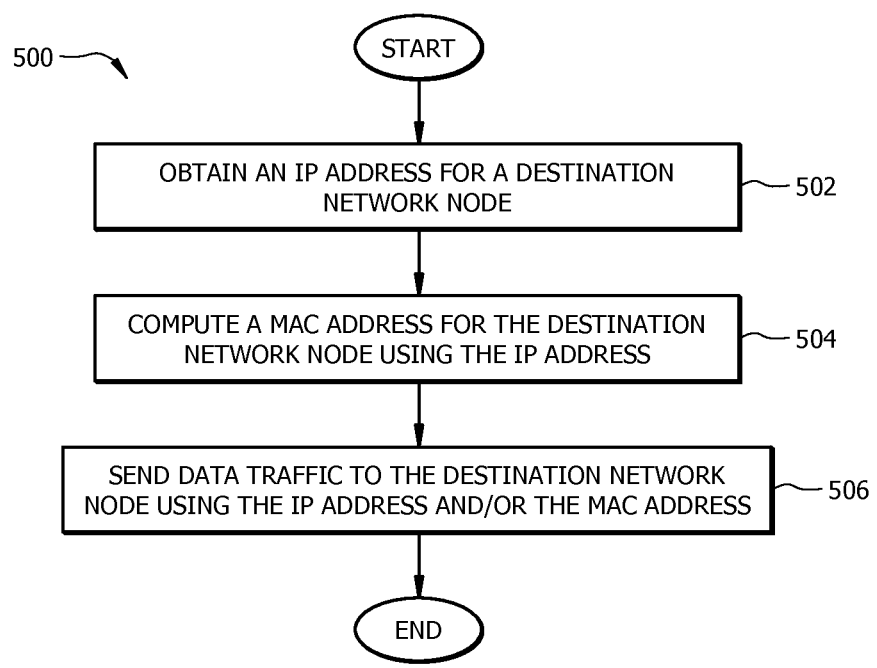
FIG. 5 is a flowchart of another embodiment of an address resolution method.

FIG. 5 is a flowchart of another embodiment of an address resolution method 500 for a network node, which may be similar to the instructions stored in address resolution module 260 described in FIG. 2. In an embodiment, a network node (e.g., network node 104A-104C described in FIG. 1) may be configured to determine an IP address for a destination network node, to compute a MAC address for the destination network node using the IP address of the destination network node, and to send data traffic to the destination network node using the MAC address and/or the IP address. At step 502, the network node may obtain an IP address for a destination network node. In an embodiment, the network node may send an IP address request to a delegate server and receive an IP address response from the delegate server that comprises an IP address for the destination network node. For example, sending an IP address request and receiving an IP address response may be similar to steps 314 and 316 described in FIG. 3. In an embodiment, step 502 may be optional. At step 504, the network node may compute a MAC address (e.g., physical MAC address and/or virtual MAC address) for the destination network node using the received IP address. The network node may compute the MAC address for the destination network node using the IP address for the destination network node similar to step 312 described in FIG. 3. At step 506, the network node may send data traffic to the destination network node using the IP address and/or the MAC address of the destination network node. The network node may send Layer 2 data packets and/or Layer 3 data packets to the destination network node using the computed MAC address for the destination network node and/or the IP address for the destination network node. For example, sending data traffic may be similar to step 320 described in FIG. 3.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method implemented in a network node, comprising:
   obtaining, by the network node, an Internet Protocol (IP) address for a destination network node;
   generating, by the network node, without performing a table lookup and without performing an "APR (Address Resolution Protocol)" request, a Media Access Control (MAC) address for the destination network node using a mapping function that uses the IP address obtained for the destination network node; and sending, to the destination network node, data traffic using the MAC address generated for the destination network node.

2. The method of claim 1, wherein the mapping function uses the IP address obtained for the destination network node and a tenant identifier in generating the MAC address.

3. The method of claim 2, wherein the tenant identifier is one of a virtual local area network identifier and a multi-protocol label switching (MPLS) label identifier.

4. The method of claim 2, wherein the mapping function uses at least a portion of the IP address obtained for the destination network node as a prefix with the tenant identifier in generating the MAC address for the destination network node.

5. The method of claim 2, wherein the mapping function uses at least a portion of the IP address obtained for the destination network node as a postfix with the tenant identifier in generating the MAC address for the destination network node.

6. The method of claim 5, wherein the portion of the IP address that is used as the postfix is dependent upon a type of the IP address obtained for the destination network node.

7. The method of claim 1, wherein obtaining the IP address comprises:
 sending an IP address request to a delegating server, wherein the IP address request requests the IP address for the destination network node; and
 receiving an IP address response from the delegating server in response to the IP address request, wherein the IP address response comprises the IP address for the destination network node.

8. An address resolution method implemented in a network node, comprising:
 obtaining, by the network node, an Internet Protocol (IP) address for the network node, wherein the IP address is obtained from configuration information stored on the network node;
 generating, by the network node, without performing a table lookup and without performing an "APR (Address Resolution Protocol)" request, a Media Access Control (MAC) address for the network node in accordance with the IP address obtained for the network node using a mapping algorithm;
 configuring an Ethernet interface for the network node using the generated MAC address; and
 sending data traffic to a destination network node using the Ethernet interface.

9. The method of claim 8, wherein the generated MAC address is a virtual MAC address.

10. The method of claim 8, wherein the generated MAC address is a physical MAC address.

11. The method of claim 8, wherein generating the MAC address for the network node comprises using a hashing algorithm.

12. The method of claim 8, further comprising:
 obtaining a destination node IP address for the destination network node;
 generating a destination node MAC address for the destination network node using the destination node IP address obtained for the destination network node; and
 sending data traffic using the destination node MAC address generated for the destination network node.

13. The method of claim 12, wherein sending the data traffic further comprises using the destination node IP address for the destination network node.

14. The method of claim 8, wherein the configuration information is provided by a network operator.

15. The method of claim 8, wherein the configuration information is provided by a vendor.

16. An apparatus comprising:
 a receiver configured to receive an Internet Protocol (IP) address for a destination network node from a network node in response to an IP address request; and
 a processor coupled to a memory and the receiver, wherein the memory comprises computer executable instructions stored in a non-transitory computer readable medium such that when executed by the processor causes the processor to:
 generate, without performing a table lookup and without performing an "APR (Address Resolution Protocol)" request, a Media Access Control (MAC) address for the destination network node using a mapping function and the IP address obtained for the destination network node; and
 send data traffic to the destination network node using the generated MAC address for the destination network node.

17. The apparatus of claim 16, wherein the computer executable instructions further cause the processor to:
 send the IP address request to the network node, wherein the IP address request requests the IP address for the destination network node; and
 receive an IP address response from the network node in response to the IP address request, wherein the IP address response comprises the IP address for the destination network node.

18. The apparatus of claim 17, wherein the IP address request is sent within a Layer 3 network.

19. The apparatus of claim 16, wherein the generated MAC address for the destination network node is a virtual MAC address.

20. The apparatus of claim 16, wherein the generated MAC address for the destination network node is a physical MAC address.

* * * * *